Feb. 4, 1969 — D. W. DUFFEY ET AL — 3,425,439
BUTTERFLY VALVE
Filed Oct. 19, 1965
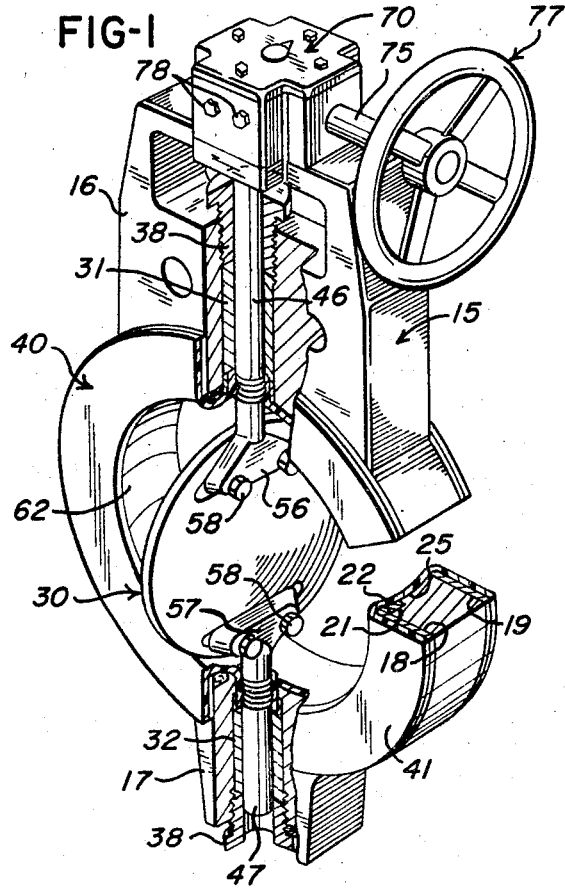
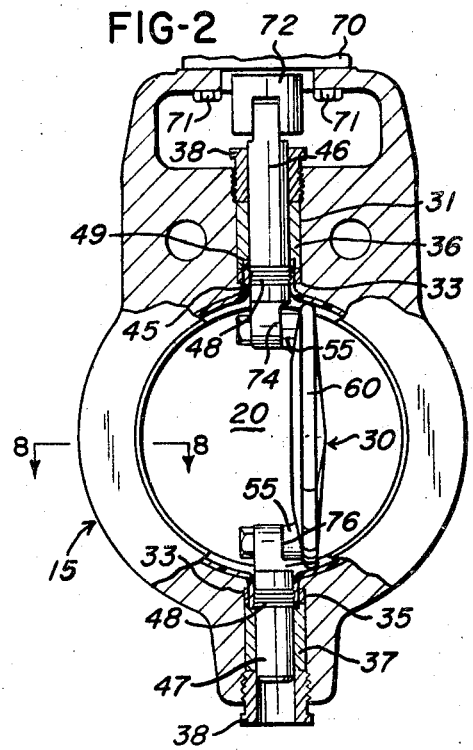
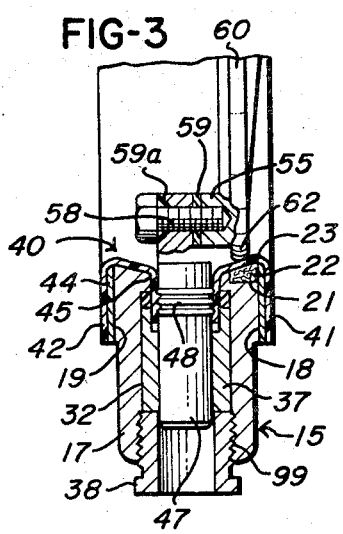
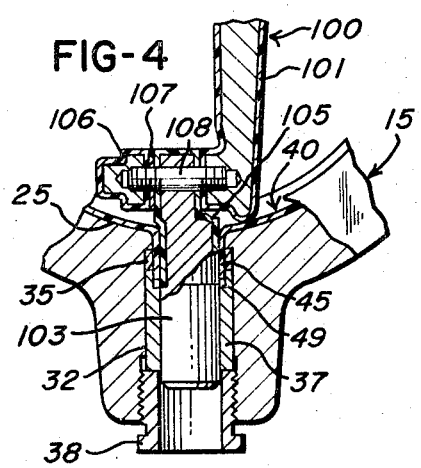
INVENTORS
DONN W. DUFFEY
JACK L. WISSMAN
Marechal, Biebel, French & Bugg
ATTORNEYS

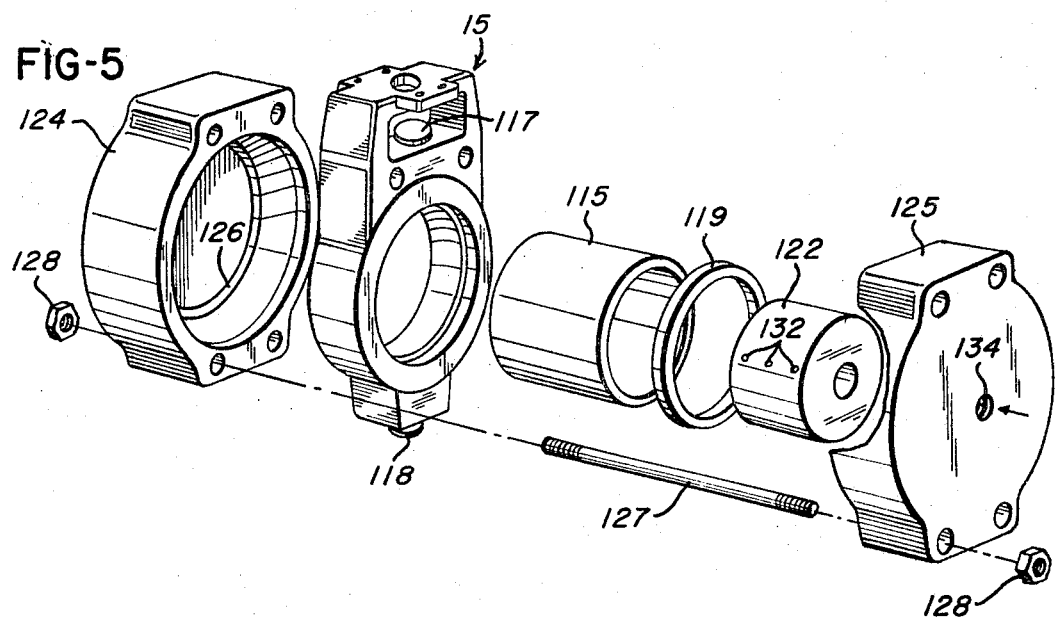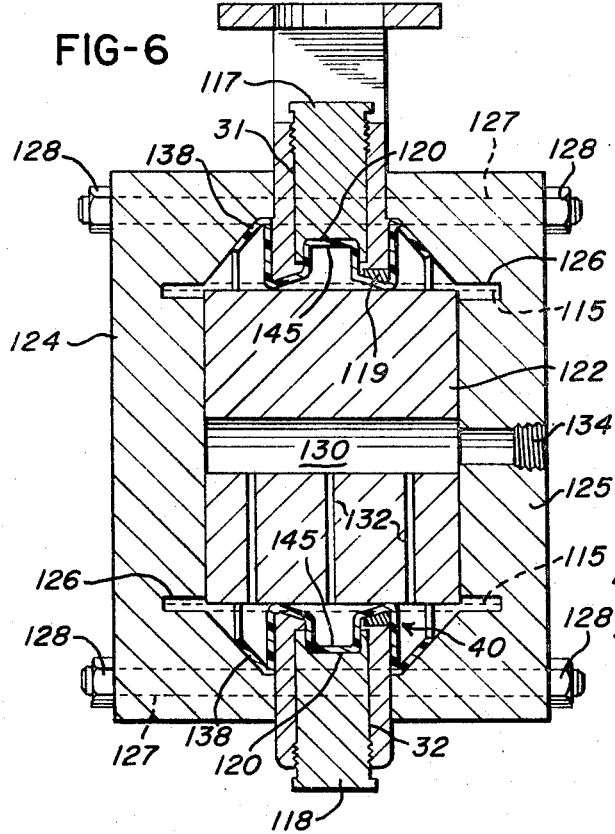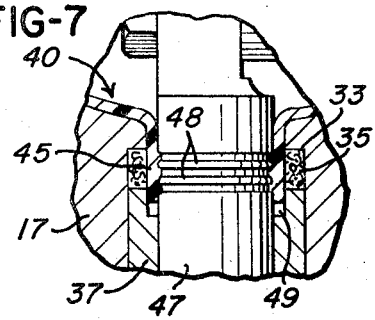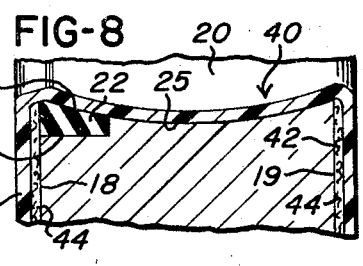

United States Patent Office 3,425,439
Patented Feb. 4, 1969

3,425,439
BUTTERFLY VALVE
Donn W. Duffey and Jack L. Wissman, Dayton, Ohio, assignors to The Duriron Company, Inc., Dayton, Ohio, a corporation of New York
Filed Oct. 19, 1965, Ser. No. 497,826
U.S. Cl. 137—375    8 Claims
Int. Cl. F16l 58/00; F16k 1/22, 41/00

ABSTRACT OF THE DISCLOSURE

Butterfly valves for corrosion resistant service include a one-piece polytetrafluoroethylene resin liner while the valve disk is a corrosion resistant material such as titanium or a metal covered with polytetrafluoroethylene. The disk is offset and provides a 360° seat formed by the liner and a resilient rubber backing member between the liner and the body. Adjustable seals are provided for each stem of the valve disk.

---

This invention relates to an improved butterfly valve capable of use in a conduit handling a corrosive fluid, and more particularly to a butterfly valve having a layer of corrosion resistant non-metallic material covering the internal metal surfaces which would otherwise be exposed to the fluid.

To provide a butterfly valve with strength and rigidity in addition to economy, it is desirable to cast the valve body from a relatively inexpensive metal alloy. However, in many installations such as in the chemical industry, it is also desirable that the valve components be constructed to provide resistance to corrosion so that the valve will operate properly and will not deteriorate over an extended period of use.

Valves of the butterfly type generally include a seal element in the interior of the valve which provides a seat for the closure member. A resilient seat, such as rubber or the like, is desirable since it provides efficient sealing between the body and the closure member. Yet many materials which provide the desired resiliency do not exhibit the corresion resistant characteristics needed for long life performance with corrosive materials. Elastomeric materials such as rubber are easily formed into the desired shape for use as a seal element, and some specially compounded or formulated elastomers have been used and have provided limited service with certain corrosive materials. The result is that it is usually the practice to stock a rather wide variety of seal elements each formulated or compounded to provide corrosion resistance to a specific material or class of materials. It is desirable to provide a butterfly valve which provides a seal element which is protected in some fashion with a material having exceptional corrosion resistance and which also provides the resiliency desired for efficient sealing.

In addition to providing a butterfly valve with the ability to resist corrosive fluids, it is also desirable that the valve be constructed to eliminate the problems of leaks developing either around the valve stem or between the closure disk and the valve seat. A leak at the valve stem not only prevents smooth operation of the valve by may cause damage due to the release of toxic or highly corrosive materials, and of course, a leak at the valve seat reduces the effectiveness of the valve for stopping the flow of fluid.

The unusual properties of fluorocarbon materials, and especially polytetrafluoroethylene make this material well suited for use in handling corrosive materials, and the specific properties of chemical inertness, high heat stability, toughness, flexibility and exceptionally low coefficient of friction make this material especially desirable for use in protecting the internal surfaces of valves. Accordingly, the present invention is generally directed to an improved butterfly valve which includes a layer of corrosion resistant plastic material such as polytetrafluoroethylene covering the internal metal surfaces which would otherwise be exposed to corrosive fluids.

Thus it is a primary object of the present invention to provide an improved butterfly valve which incorporates a highly corrosion resistant liner for protecting the internal metal surfaces of the valve body and the seal element over an extended period of use.

Another object of the invention is to provide an improved butterfly valve having a liner which is so constructed from a polytetrafluoroethylene material that one liner can be used for protecting the valve from substantially any corrosive fluid.

It is also an object of the invention to provide a butterfly valve as outlined above wherein an annular portion of the liner provides a sealing seat for the disk-shaped closure member, and a separate resilient ring surrounds the seat to provide a tight seal of uniform peripheral pressure between the closure member and the liner.

Still another object of the invention is to provide a butterfly valve having a corrosion resistant liner and an offset disk-shaped closure member which engages a 360° seat defined by the liner and which closure member is self-centering so that a uniform peripheral seal is provided between the closure member and the liner.

A further object is to provide a butterfly valve as outlined above wherein the fluorocarbon liner has an integral cylindrical portion which surrounds the valve stem and which portion is surrounded by a resilient ring adapted to be deformed to provide a uniformly tight circumferential stem seal.

Still another object of the invention is to provide a butterfly valve as described above wherein the valve stem is provided with circumferential grooves which cooperate with a cylindrical portion extending from the liner to provide an adjustable seal providing circumferential high and low pressure seal areas so that a high pressure seal is established while also providing expansion spaces to accommodate expansion of the liner material surrounding the stem incident to increases in temperature.

Another object of the invention is to provide a butterfly valve as outlined above which includes a corrosion resistant material on the surfaces of the disk-shaped closure member and the adjacent surfaces of the valve stem so that all of the internal surfaces of the valve are protected from the corrosive fluid.

It is also an object of the invention to provide a process and apparatus for forming a one-piece liner for the body of a butterfly valve.

Other objects and advantages of the invention will be apparent from the following description, the accompanying drawings and the appended claims.

In the drawings:

FIG. 1 is a perspective view, partly broken away, showing a butterfly valve constructed in accordance with the invention and in open position;

FIG. 2 is an elevational view, partly broken away in section, of the valve of FIG. 1 in open position;

FIG. 3 is an enlarged fragmentary view of the valve of FIGS. 1 and 2 showing a portion of the mounting of the supporting stem for the closure member and with the latter in closed position;

FIG. 4 is an enlarged detailed sectional view similar to FIG. 3 showing a closure member and a supporting stem having a corrosion resistant coating;

FIG. 5 is an exploded perspective view of the apparatus for forming the one-piece liner for the butterfly valve body of FIGS. 1 and 2;

FIG. 6 is an assembly view in axial section of the apparatus shown in FIG. 5;

FIG. 7 is an enlarged fragment of FIG. 3, the seal construction between the valve stem and the liner for the body; and FIG. 8 is an enlarged section on the line 8—8 of FIG. 2.

Referring to the drawings, which illustrate preferred embodiments of the invention, the butterfly valve shown in FIG. 1 includes a body 15 which preferably is cast from a metal material such as ductile iron, aluminum or the like. The body 15 includes oppositely extending ear portions 16 and 17 and is provided on its opposite ends with end faces or surfaces 18 and 19 which are preferably flat and in parallel relationship. Centrally formed within the body 15 is a generally circular passageway or bore 20 which extends between the end surfaces 18–19, but this passageway may be non-circular, for example oval, in configuration if desired. The end surface 18 is provided at its radially inner edge with a counterbore 21 in which is mounted a resilient ring 22 of a suitable elastomeric material. As best seen in FIG. 8, the radially inner surface 23 of this ring 22 is substantially flush with the slightly spherically curved inner surface 25 defining the passageway 20, and flow through this passageway is controlled by the valve disk indicated generally at 30 which constitutes the closure member of the valve as described in more detail hereinafter.

As shown in FIG. 2, the mounting for the valve disk 30 includes a pair of diametrically opposed cylindrical openings 31–32 extending through the ear portions 16–17 respectively. Each of these openings 31–32 is counterbored over the major part of its length to provide an annular shoulder 33 (FIG. 7) at its inner end, and a resilient ring 35 of rubber or the like is seated on each of these shoulders. A pair of sleeve bearings 36–37 are mounted in the openings 31–32 respectively, and the outer end of each of these openings is threaded to receive a retaining gland member 38.

The resilient ring 22 and the spherical surface 25 of the body 15 are covered and enclosed by a one-piece corrosion resistant liner 40 preferably of polytetrafluoroethylene having integral flange portions 41 and 42 which extend radially outwardly in covering relation with the respective end surfaces 18 and 19 of the body 15. Preferably, a flat ring gasket 44 such as compressed asbestos (FIG. 3) is located between each of the flanges 41–42 and surfaces 18–19 respectively, to promote uniform pressure clamping of the valve assembly between the end flanges of a pipeline in use. The gasket members 44 have been found to minimize the tendency of the PTFE material of the flanges to change dimension or shape due to changes in temperature.

As previously mentioned, the liner 40 is preferably made from polytetrafluoroethylene to provide the body 15 with a substantially uniform cover layer of highly corrosion and heat resistant material which will protect both the surface 25 of the passage 20 and the surface 23 of the resilient ring 22 from exposure from corrosive fluids passing through the valve. In addition, the liner 40 includes a pair of cylindrical ears or extensions 45 which extend into the respective openings 31–32 and through the resilient rings 35. These cylindrical extensions 45 enclose inner end portions of a control stem 46 and support stem 47 for the disk 30, which are journaled in the respective bearings 36 and 37.

As best seen in FIGS. 2 and 7, the stems 46 and 47 are provided with a plurality of circumferential grooves 48 in the areas enclosed by the liner extensions 45. In addition, the bearings 36 and 37 have their inner ends counterbored at 49 to telescope with the extensions 45 into engagement with the respective rings 35. Thus as the gland members 38 are threaded into the openings 31–32, respectively, the bearings 36 and 37 deform the resilient rings 35 and thereby cause them to force the material of the liner extensions 45 into sealing engagement with the stems 46 and 47. By providing a plurality of continuous spaced circumferential grooves 48, each stem 46 and 47 is provided with spaced preferably continuous lands 50 which cooperate with the bearings 36–37 and the rings 35 and the corresponding liner extensions 45 to provide a plurality of axially spaced high pressure seal areas surrounding each of the stems 46 and 47.

The grooves 48 cooperate with the corresponding liner extension 45 to form spaced low pressure seal areas and expansion spaces into which the polytetrafluoroethylene material may expand in the event that the temperature of the valve is increased. These grooves provide for relief of stresses developed in the liner material as the temperature increases and cooperate with the lands 50 to prevent substantial movement of the liner extensions 45 axially of the corresponding stems 46 or 47. In the event that some adjustment in sealing pressure is necessary, this is easily accomplished by turning the retaining gland member 38 in order to increase the sealing pressure between the stem and the corresponding extension 45. It is also possible in accordance with the present invention to utilize a bearing such as 36 or 37 having a tapered end which compresses the liner extensions 45 into sealing engagement with the corresponding stem although it is preferred to utilize a resilient material since this tends to reduce the cold flow of the polytetrafluoroethylene material in the area of the stem seals.

FIGS. 1 and 2 best illustrate the construction of the disk 30 and its stems 46–47, which are so proportioned that in the open position of the valve, the portions of these parts which lie in the passage 20 occupy less than 25% of the flow area therethrough in order to minimize turbulence of the fluid transmitted by the open valve. Preferably, the disk 30 is eccentrically positioned or offset from the stems 46–47, as by providing the disk 30 with bosses 55 of generally triangular outline which mount on complementary shaped end heads 56–57 on the stems 46–47 respectively. A pair of self-locking cap screws 58 are threaded into each boss 55 through the associated head 56 or 57 to secure these parts together. A relatively thin PTFE gasket 59 is positioned between the head and the boss, and a PTFE wedge 59a is inserted between the head of the cap screw and the head for reducing corrosion at the joints.

The radially outermost portion of the disk 30 comprises a land or bead 69 slightly greater in diameter than the inner diameter of the annular seat 62 defined by the portion of the liner 40 which overlies the resilient ring 22. For example, an interference fit of approximately $\frac{1}{16}$ inch on the diameter has been found satisfactory with a 6-inch valve. Thus as the disk 30 is rotated from its open position of FIGS. 1 and 2 to its closed position shown in FIG. 3, the seat 62 is adapted to flex radially outwardly, therefore deforming the ring 22 against the land 60. This uniform pressure seating is further promoted by the ability of the stems 46–47 to float axially to the slight extent necessary to assure accurate centering of the disk 30 on the seat 62.

As the disk 30 is opened to the position of FIG. 2, a resilient force is exerted at all times by the seat 62 against two contact areas on the land 60. This constant pressure has been found desirable to hold the disk 30 in any position in which it is set and to prevent it from vibrating as the fluid flows through the passageway 20. As one means of operating the disk 30, a gearbox 70 is mounted on the valve body 15 by bolts 71 (FIG. 2) and includes a drive yoke 72 which is coupled to the adjacent end of the control stem 46.

Mounted on the input shaft 75 extending from the gearbox 70 is a hand wheel 77 which is turned to operate the butterfly valve between open and closed positions. Preferably, adjustable stop screws 78 are provided in the gearbox 70 to define the limits of rotation of the disk 30 and thereby to provide precision alignment of the disk 30 with the seat 62 when the valve is closed as well as a position parallel to the axis of the passageway 30 when the valve is fully opened. It is to be understood, however, that other means may be used to rotate the disk 30, as for example, a pneumatic system rather than a manual system.

The disk 30, control stem 46 and supporting stem 47 shown in FIGS. 1–3 are preferably each formed from a corrosion resistant material such as stainless steel. Such material is suitable for valves handling many corrosive fluids, but, with a highly corrosive fluid such as a pickling solution, a valve structure as shown in FIG. 4 has been found desirable.

In FIG. 4, the closure disk 100 is provided with a layer or coating 101 of non-metallic material such as polytetrafluoroethylene, fluorinated ethylene propylene, polychlorotrifluoroethylene, vinylidine fluid, high molecular weight chlorinated polyethers and other corrosion resistant materials, and the inwardly extending portions of the support stem 103 and the control stem 46 (not shown in FIG. 4) are provided with a similar coating 105. In addition, a coated nut 106 and polytetrafluoroethylene washer 107 are provided for end stud 108 so that all of the internal surfaces of the rotary components of the valve are protected along with the body 15 by the liner 40. The coating on the closure disk 100 and on the control and support stems may be applied by the process disclosed in copending application Ser. No. 497,869, filed Oct. 19, 1965, assigned to the same assignee as this application, when it is desirable to provide a uniform high density coating of polytetrafluoroethylene.

The circumferential grooves and lands may be omitted from the valve disk stems of FIG. 4 so that the coating 105 on the stems provides a cylindrical seal with the cylindrical portions 45 of the liner 40. This modified construction provides an effective seal, and in addition, as a result of the low coefficient of friction of the fluorocarbon material used for the liner 40 and for the coating 105, it provides for easy operation of the valve from its open position to its closed position even after the valve has been used for an extended period of time in a conduit or pipe line conducting a highly corrosive fluid.

The corrosion resistant liner 40 shown in FIGS. 1–4 is formed from a cylindrical section of tubing extruded from a fluorocarbon material, and satisfactory results have been obtained with polytetrafluoroethylene having a wall thickness of approximately .090 inch. The tube may also be formed by an isostatic molding process to provide a high density tube substantially free of voids and having uniform expansion characteristics throughout its length and in its cross-section. The details of such isostatic molding process are described in application Ser. No. 497,869 filed of even date herewith and assigned to the same assignee. As shown in FIGS. 5 and 6, a cylindrical tube 115 of plastic is inserted within a mold cavity having an internal configuration the same as the valve body. In fact, for production purposes, a body 15 may be used as a mold by inserting a plug 117 within the opening 31, a plug 118 within the opening 32 and a metal ring 119, having the same configuration as the resilient ring 22, within the counterbore 21. Each of the plugs 117 and 118 is provided with a cylindrical bore 120 having an inner diameter which corresponds to the diameter of the counterbore 49 in the ends of the bearings 36 and 37.

A cylindrical mandrel 122 is then inserted within the fluorocarbon plastic tube 115 and is clamped in place between end caps 124 and 125, which are secured to opposite faces or ends of the body 15 by a series of four studs 127 and nuts 128. The end caps 124 and 125 are provided with cylindrical grooves 126 (FIG. 6) which receive the end portions of the tube 115 and provide additional material for feeding the mold cavity so that the liner does not thin out or tear in areas of greatest stress.

The mandrel 122 is provided with a central passageway 130 and a series of smaller passageways 132 which extend radially to the outer cylindrical surface of the mandrel which is adjacent the inner surface of the tube 115. The passageway 130 is aligned with an inlet passageway 134 formed centrally within an end cap 125 for receiving a suitable pressure line (not shown).

To form the liner 40 from the tube 115, the assembled unit as shown in FIG. 6 including the tube 115 is placed in an oven or furnace for approximately three hours and heated to assure that the tube 115 has reached a temperature of approximately 620° F. Air is then supplied through the opening 134 at a pressure of around 300–400 p.s.i. This pressure is directed against the inner surface of the tube 115 through the passageways 132 and thereby deforms the hot tube into the configuration of the liner 40 as shown in FIG. 6.

This pressure and temperature are held for approximately four minutes, after which the assembled unit is quenched in cool water. The slight shrinkage of the liner as it is cooled produces some leakage of air around the liner which causes the internal pressure to drop. When the pressure reaches approximately 100 p.s.i., this lower pressure is maintained by an additional supply of air until the assembled unit has dropped to a temperature of around 80° to 90° F. The unit is then disassembled by removing the end caps 124 and 125 and the mandrel 122. This enables the pliable liner 40 to be removed from the mold or body 15, after which the excess flanges 138 are trimmed from the liner 40 along with the cap ends 145 of the cylindrical portions 45.

From the drawings and the above description, it can be seen that a butterfly valve formed in accordance with the present invention provides several desirable features and advantages. Basically, the one-piece polytetrafluoroethylene liner 40 protects the complete internal surfaces of the valve body 15, and this liner can be used for practically any type of corrosive fluid at temperatures upwards towards 300°–350° F. Thus it is unnecessary to provide a number of different liners or seal elements for correspondingly different applications.

By offsetting the closure disk 30 in relation to the axis of the stems 46 and 47, and by surrounding the seat 62 of the liner with a resilient ring 22, it can be seen that the valve formed in accordance with the invention provides a 360° seal of uniform pressure between liner 40 and the closure disk 30. Furthermore, the resilient ring 22, which is formed from a suitable elastomer, is never exposed to the corrosive fluid flowing through the passageway 20.

Another important feature of the invention is the seals which are provided between the cylindrical portions 45 of the liner 40 and the corresponding stems 46 and 47. These seals may be conveniently adjusted after the valve has been installed simply by turning the gland members 38. This produces an axial adjustment in the position of the cylindrical bearings 36 and 37 which, in turn, deforms the resilient rings 35 surrounding the cylindrical portions 45 and thereby provides for a tighter seal. The grooves 48 and lands 50 formed in the stems 46 and 47 have also been found desirable as they provide a series of alternate low and high pressure ring seals with the cylindrical portions and the stems. In fact, a butterfly valve formed in accordance with the invention has been tested by alternately introducing steam and water for cycles of seven minutes each. The pressures for the water and steam were maintained at 75 p.s.i. and 125 p.s.i., respectively. After 1500 cycles, the stem seals were still performing without leaks and the closure member was effectively sealing around the 360° seat 62.

In another test, a valve body of Durimet 20 alloy to which a pneumatic closing device has been affixed was opened and closed for 2000 times under service conditions of 100 pounds per square inch pressure and 200° F. with a fluid consisting of 98% sulphuric acid. The valve performed quite satisfactorily.

A four-inch valve in accordance with the present invention of Durimet 20 alloy was opened and closed 15,000 times under service conditions of 98% $H_2SO_4$ at 200° F. and a pressure of 40–50 p.s.i. The valve was tested for twenty-four hours a day and was in the open position five minutes and closed for one minute. During the test period, the valve was removed from the line several times and tested for leaks at 100 p.s.i., and none were found. The valve also performed well while installed in the line. As a part of this test, the valve was removed after 15,000 cycles (open and closed), and installed in a system so that stems 46 and 47 were exposed to line pressure. Thus installed, the valve held pressure up to 1000 p.s.i. apparently because the pressure forced the disk tightly into the seat. This valve had been rated for service at 150 p.s.i.

When it is desirable to provide a protective coating for not only the body 15 but also the rotary components of the valve for handling highly corrosive fluids, a structure as shown in FIG. 4 has been found desirable. In this embodiment, all of the internal surfaces which would otherwise be exposed to the corrosive fluids are provided with a non-metallic layer of corrosion resistant material such as a fluorocarbon material.

One feature of the present invention is the use of polytetrafluoroethylene as a liner material and as a coating material for the closure member and associated elements which are exposed to fluid flowing through the valve. Polytetrafluoroethylene, available under the trademark Teflon is supplied in several different grades including Teflon 1, 1B and 5 which are general purpose molding powders, Teflon 7, an ultra-fine molding powder and Teflon 6 and 6C which are special purpose powders used for extrusion, and Teflon 30 which is an aqueous dispersion of polytetrafluoroethylene.

Polytetrafluoroethylene resins are to be distinguished from copolymers of tetrafluoroethylene and hexafluoropropylene, a typical example of the latter copolymer being a material available under the trademark Teflon FFP. This copolymer exhibits a melt viscosity sufficiently low for conventional thermoplastic processing and thus differs from polytetrafluoroethylene which has an infinite melt viscosity. Although polytetrafluoroethylene is considered a thermoplastic it cannot be processed by the conventional thermoplastic processing techniques. Additionally, parts fabricated of polytetrafluoroethylene are stable over a wider range of temperatures than parts of the copolymer to tetrafluoroethylene and hexafluoropropylene. Unlike the copolymer, polytetrafluoroethylene possesses an infinite melt viscosity and a plastic memory which tends to cause a heat shaped product to return to the shape in which it was originally formed. For further details as to the nature and processing of these who materials, reference is made to Modern Plastics Encyclopedia, Vol. 40, No. 1A, September 1963.

Thus, if a tube of polytetrafluoroethylene were formed into a liner by heat and pressure as herein described, as the temperature increases, there is a proportionate tendency for the liner to return to a tubular shape. In the case of a liner formed of a copolymer (Teflon FEP) there is little temperature stability at elevated temperatures because of the true thermoplastic nature of the copolymer. Thus, while the copolymer is easier to form into various shapes, it does not as a general rule perform as well at elevated temperatures as does polytetrafluoroethylene. It is this very characteristic of polytetrafluoroethylene which renders it difficult to fabricate hot formed products, such as the liner of the present invention, and the cold quenching technique under pressure previously described has been found satisfactory for imparting to the formed liner of polytetrafluoroethylene sufficient dimensional stability at elevated temperatures to be used at temperatures in the range of 300° to 350° F. while the copolymer has a maximum useable temperature around 200° to 300° F.

Polytetrafluoroethylene exhibits a characteristic which is sometimes referred to as "memory." If a part is fabricated of polytetrafluoroethylene and thereafter processed by heat and pressure to change the shape of the part from its original shape, for example, from a tube to a liner as herein described, the primary plastic memory of the part is of its original tubular shape and the secondary plastic memory is of the liner configuration. It is a characteristic of polytetrafluoroethylene that hot or cold formed products tend to return to their original shape as the temperature thereof is increased, and in fact one test for determining whether a part has been hot or cold worked is to place the part in an oven and elevate the temperature of the part to about 700° to 715° F. to determine what changes in configuration take place. In the latter temperature range, a hot or cold worked part will revert to its original shape.

The liner of the present invention exhibits a primary memory of its tubular shape and a secondary memory of its shape as shown in FIG. 1, for example. As the temperature of the liner is increased there is a tendency for the liner material to return to its tubular shape, however, by providing end flanges 41 and 42 which are held in place by the pipe flanges, and by providing stem seals which hold the cylindrical portions of the liner, an effective means is provided for holding or confining the liner so that it tends to retain its shape at elevated temperatures. This is particularly true when the liner is exposed to temperatures of the range of 300° to 350° F. wherein there is a tendency for the liner to return to its original shape.

It is also possible in accordance with the present invention to form the liner into its proper configuration by an isostatic molding process described in the aforesaid application Ser. No. 497,869 in which case the liner will posses a primary memory and have a stable configuration at a temperature in excess of 400° F.

While the forms of apparatus and process herein described constitute preferred embodiments of the invention, it is to be understood that the invention is not limited to these precise forms of apparatus and process, and that changes may be made therein without departing from the scope of the invention which is defined in the appended claims.

What is claimed is:

1. A butterfly valve for use in a conduit for handling corrosive fluids and adapted for use over a wide range of temperatures, comprising means defining a body having spaced end faces and including a bore between said end faces for passage of fluid through said body, means in said body defining two spaced openings between said end faces and communicating with said bore, a one-pice polytetrafluoroethylene liner mounted in said bore, said liner including integral cylindrical portions extending through each said opening, resilient annular seal ring means received between said liner and said body, a rotatable disk member received in said bore and including two valve stem elements each of which extends through one of said openings and is surrounded by the corresponding cylindrical portion of said liner, said disk member cooperating with said seal ring means and said liner to form a substantially fluid tight high pressure seal only in the closed position of said disk member for preventing flow of fluid through said lined bore, means affixed to one of said valve stem elements to rotate said disk member from one position to another, means cooperating with each said valve stem element and body for providing stem seal means preventing passage of fluid out of said bore and past each said stem element, and said liner including integral portions thereof extending radially outwardly of said bore and held in place when said valve is assembled in a conduit for maintaining said liner properly positioned within said bore over a wide range of temperatures.

2. A butterfly valve as defined in claim 1 wherein each sail valve stem element includes axially spaced grooves cooperating with said cylindrical portion of said liner for providing spaced high pressure seal areas between said body and said valve stem elements.

3. A butterfly valve as set forth in claim 1 wherein said disk member is completely covered with polytetrafluoroethylene resin material.

4. A butterfly valve as set forth in claim 1 wherein said stem seal means is adjustable and portions of said liner received between said valve stem means and includes resilient means surrounding said cylindrical portion of said liner, and means for confining said resilient means to provide a uniform circumferential sealing pressure between said body and cylindrical portion of said liner and said valve stem means to prevent leakage of corrosive fluid from said bore outwardly along said valve stem means.

5. A butterfly valve as defined in claim 1 including a resilient member received in each said opening and surrounding said stem elements, and bearing means positioned around each said stem element and contacting said resilient member in each opening for forming a seal between said body and the said stem element.

6. A butterfly valve as defined in claim 5 wherein each said bearing means includes a bearing member slidably mounted within said opening for rotatably supporting each said stem element, and a gland member threadably mounted to said body for axially moving said bearing member to compress said resilient member.

7. A butterfly valve as set forth in claim 1 wherein said disk member is mounted on said stems within said bore and eccentrically positioned in relation to the axis of rotation of said stem elements, and wherein said liner is of substantially uniform wall thickness within said bore.

8. A butterfly valve as set forth in claim 1 wherein said liner has a primary memory of a tubular configuration and a secondary memory of its shape as a liner.

References Cited

UNITED STATES PATENTS

| | | | |
|---|---|---|---|
| 3,072,139 | 1/1963 | Mosites | 137—375 |
| 3,073,336 | 1/1963 | Johnson | 137—375 |
| 3,143,132 | 8/1964 | Pangburn | 137—375 |
| 3,148,896 | 9/1964 | Chu | 137—375 XR |
| 3,227,174 | 1/1966 | Yost | 137—375 |
| 3,329,398 | 7/1967 | Goldsmith | 251—306 |

FOREIGN PATENTS

| | | |
|---|---|---|
| 647,005 | 8/1962 | Canada. |
| 1,226,799 | 2/1960 | France. |

HENRY T. KLINKSIEK, *Primary Examiner.*

U.S. Cl. X.R.

251—306, 308

UNITED STATES PATENT OFFICE
CERTIFICATE OF CORRECTION

Patent No. 3,425,439 February 4, 1969

Donn W. Duffey et al.

It is certified that error appears in the above identified patent and that said Letters Patent are hereby corrected as shown below:

Column 1, line 42, "corresion" should read -- corrosion --. Column 5, line 52, after "body" insert -- 15 --. Column 7, line 33, "FFP" should read -- FEP --. Column 8, line 44, "one-pice" should read -- one-piece --; line 67, "sail" should read -- said --; line 75, cancel "portions of said liner". Column 9, line 1, cancel "received between said valve stem means and".

Signed and sealed this 24th day of March 1970.

(SEAL)
Attest:

Edward M. Fletcher, Jr.                        WILLIAM E. SCHUYLER, JR.
Attesting Officer                               Commissioner of Patents